US006968542B2

(12) United States Patent
Bagley et al.

(10) Patent No.: US 6,968,542 B2
(45) Date of Patent: Nov. 22, 2005

(54) METHOD FOR DYNAMICALLY IDENTIFYING PSEUDO-INVARIANT INSTRUCTIONS AND THEIR MOST COMMON OUTPUT VALUES ON FREQUENTLY EXECUTING PROGRAM PATHS

(75) Inventors: Richard J. Bagley, Arlington, MA (US); Dean M. Deaver, Sterling, MA (US); Chris L. Reeve, Brookline, MA (US); Norman Rubin, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 09/791,912

(22) Filed: Feb. 23, 2001

(65) Prior Publication Data

US 2002/0170043 A1 Nov. 14, 2002

Related U.S. Application Data

(60) Provisional application No. 60/212,223, filed on Jun. 16, 2000.

(51) Int. Cl.$^7$ .............................................. G06F 9/45
(52) U.S. Cl. ...................... 717/139; 717/141; 712/236
(58) Field of Search ............................... 717/151–161, 717/139–141; 712/234–240

(56) References Cited

U.S. PATENT DOCUMENTS

| | | | | |
|---|---|---|---|---|
| 5,751,982 A | * | 5/1998 | Morley | 712/209 |
| 5,999,736 A | * | 12/1999 | Gupta et al. | 717/158 |
| 6,170,083 B1 | * | 1/2001 | Adl-Tabatabai | 717/158 |
| 6,631,515 B1 | * | 10/2003 | Berstis | 717/140 |
| 2001/0042172 A1 | * | 11/2001 | Duesterwald et al. | 711/125 |

OTHER PUBLICATIONS

*Wiggins/Redstone (WR): A Dynamic Optimization and Specialization Tool*, Chris Reeve et al., Compaq Computer Corporation, pp. 1-10.
*Dynamo: A Transparent Dynamic Optimization System*, Vasanth Bala et al., Hewlett-Packard Labs, pp. 1-12.
*Ephemeral Instrumentation for Lightweight Program Profiling*, Omri Traub et al., Harvard University, pp. 1-13.
*Trace Processors*, Eric Rotenberg et al., Proceedings of Micro-30, Dec. 1-3, 1997, Research Triangle Park, North Carolina (12 pp.).
*Continuous Program Optimization: A Case Study*, Thomas Kistler et al., University of California, Irvine, pp. 1-40.
*Continuous Program Optimization*, Dissertation of Thomas Kistler, 1999, University of California, Irvine, pp. 1-151.

* cited by examiner

*Primary Examiner*—Kakali Chaki
*Assistant Examiner*—Lawrence Shrader (57) ABSTRACT

A method of identifying pseudo-invariant instructions in computer program hot paths, comprising the steps of creating an intermediate representation of a hot path in a software buffer, executing instructions in the program image for the computer program until a hot path is detected, copying computer machine state and computer processor register contents to a context in memory, and using this context to compute an output a plurality of times for each instruction in the hot path using an interpreter that emulates the computer processor. Results of the interpreter computations are stored with the frequency count for each unique output in a table that is readable by a program optimizer. Frequency counts for each instruction are compared with a pseudo-invariant threshold to classify an instruction as pseudo-invariant.

30 Claims, 5 Drawing Sheets

METHOD FOR DYNAMICALLY IDENTIFYING PSEUDO-INVARIANT INSTRUCTIONS AND THEIR MOST COMMON OUTPUT VALUES ON FREQUENTLY EXECUTING PROGRAM PATHS

CROSS-REFERENCE TO RELATED APPLICATIONS

This application claims priority to the following commonly assigned provisional application entitled: "A Dynamic Optimization and Specialization Tool," Ser. No. 60/212,223, filed Jun. 16, 2000, which is hereby incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to dynamic, run-time optimization and specialization of binary executables. More particularly, the invention relates to the identification of pseudo-invariant instructions in frequently executing program paths for use in such optimization systems.

2. Background of the Invention

Improving run-time software application performance in microprocessor systems is an important means of improving processor throughput and execution speeds. While it is possible to optimize application executables at compile time, such optimizations cannot account for all the possible variables that may affect run-time performance. A priori run-time optimization is difficult to predict and implement because most executable programs operate in varying systems with varying shared libraries and operating on varying inputs. Thus, while these applications may be executed on high-performance computer systems and the executables may be optimized using a static optimizing compiler, true run-time optimization may still offer improved application performance.

Many run-time optimizers depend on identifying instructions that are pseudo-invariant. Some optimizers may refer to this identification process as value profiling. An instruction is invariant or constant if it produces the same output value every time it is executed. An instruction is pseudo-invariant if it is invariant or if it produces a limited set of output values almost every time it is executed. Instruction output is highly dependent on input data, so any given instruction may be pseudo-invariant at run-time, but not necessarily so at static compile time.

In addition, an instruction may be pseudo-invariant when reached along a particular path of program control, but not pseudo-invariant when reached along other paths. For example, consider a program comprising two function calls, each along a different path. If each call site passes a different constant argument, then instructions in the function are not dynamically invariant, but they may be invariant along each path.

The identification of pseudo-invariant program instructions is exceptionally helpful if one can determine whether that portion of the code that includes the pseudo-invariant instructions consumes a large quantity of system resources. Sequences of instructions are said to be expensive or "hot" if they take a long time to execute. If a portion of the code is expensive in this manner and it includes a pseudo-invariant instruction, the entire portion of the code may be optimized. The actual method of optimization is left to the optimizer or specializer in which this method is incorporated. Determination of the relative cost of a piece of code is important because it makes little sense to optimize a piece of code if it is inexpensive, even if the code includes pseudo-invariant instructions. The only time benefits are seen is when an expensive piece of code with pseudo-invariant instructions is located and optimized.

A number of methods have been proposed for finding and classifying pseudo-invariant instructions. One method involves the addition of instrumentation code to a program and running the modified program over a training set. This method produces accurate data value profiles for the application, but is not able to classify paths as hot. Further, since the instrumentation code cannot be removed, this method of value profiling adds considerable overhead.

Another method of value profiling invokes an interpreter at run-time via a sampling interrupt. The interpreter, which is a separate piece of code that interprets the instructions, evaluates a single block of the program and then switches control back to the original program to continue execution of the program. This method is fast, but does not generate path information. Therefore the information produced is limited.

Another proposed method uses an interpreter over the entire program to find path information. This method, however does not produce value information to determine if instructions are pseudo-invariant.

In general, the prior art is not capable of both locating expensive program paths and determining if those paths contain pseudo-invariant instructions. Furthermore, the prior art does not collect and store this information in a manner that is useful to an application optimizer or specializer.

It is desirable therefore, to develop a method of dynamically identifying pseudo-invariant instructions on frequently executed program paths. The method preferably incurs low overhead and prepares the data in a form that is easily adaptable to a variety of program optimizers and specializers.

BRIEF SUMMARY OF THE INVENTION

The problems noted above are solved in large part by a method of identifying pseudo-invariant instructions in computer program hot paths. The method involves creating an intermediate representation of a hot path in a software buffer that is separate from the in-memory program image for the computer program. Instructions in the program image are executed by the computer processor until a hot path is detected, at which point control of the program image is given up and transferred to an interpreter. Before the control transfer takes place, the computer machine state and computer processor register contents are copied to a context in memory by an interface routine. The interpreter uses this context information and contents of the computer memory to compute an output for each instruction in the hot path. The hot path is executed a predetermined number of times. The interpreter also updates the contents of the context and memory as required.

The interpreter maintains a table of values with frequency information for each output of each instruction that is readable by a program optimizer. After the interpreter has finished computing the outputs of the intermediate representation the required plurality of times, the interpreter transfers control of the execution of the program image back to the computer processor or invokes an associated optimizer or specializer. The interpreter also writes the contents of the context back to the computer processor registers.

The output table may also store additional information such as memory addresses for load or store operations requested by instructions in the intermediate representation. After the intermediate representation is interpreted the predetermined number of times, the frequency count for each value produced by each instruction is compared with a pseudo-invariant threshold. An instruction may be classified as pseudo-invariant if the frequency count in the output table for that instruction in the intermediate representation is above the pseudo-invariance threshold.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment is directed to a technique and method for identifying pseudo-invariant instructions in frequently executing paths in an executable program. The technique involves creating an alternative representation of the hot path and interpreting the instructions in that image and storing the results of that interpretation in a manner that is useful and readily available for a program optimizer/specializer.

Figure 1:
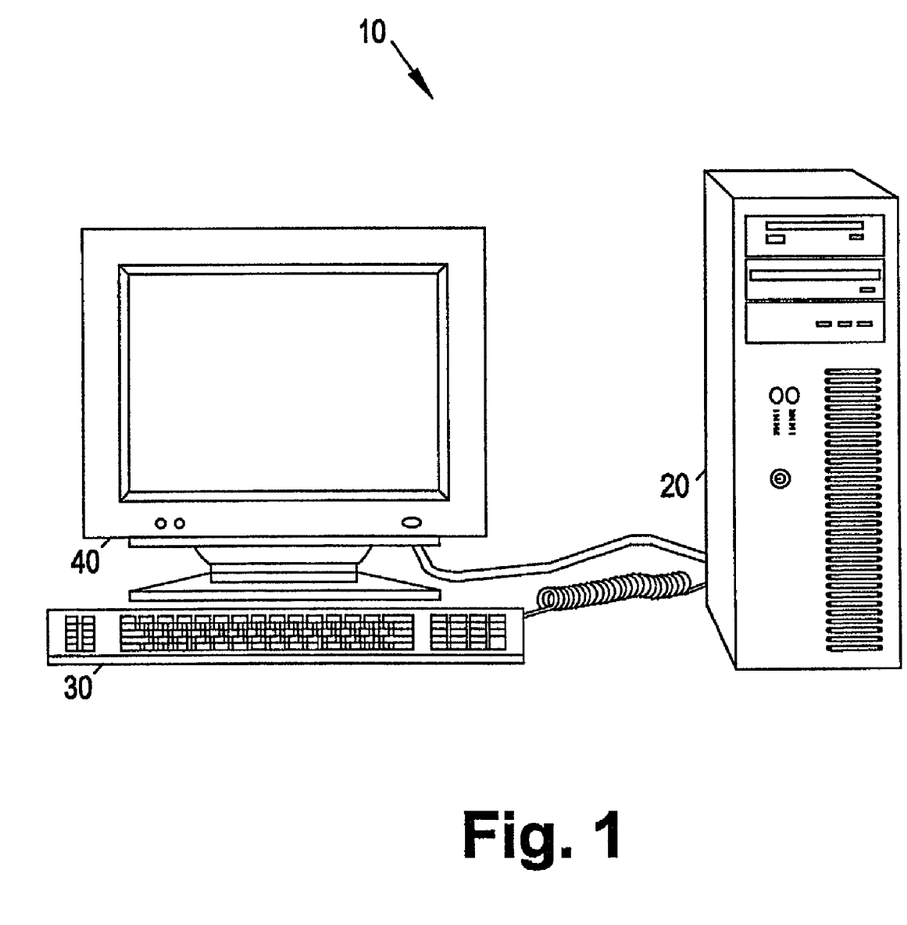
FIG. 1 is an illustrative diagram of a simple computer that executes a program and implements a program optimizer that uses the preferred embodiment.

FIG. 1 shows a general purpose computer 10 that is suitable for this technique. The computer preferably includes a processor tower or housing 20, in which the computer processor, memory and storage media are housed. The computer 10 may be a desktop computer, a dedicated server, or some other type of computer such as a laptop or portable computer. The computer 10 also preferably includes input and output devices such as a keyboard 30, mouse, display 40, printer, or other devices that permit user interface.

Figure 2:
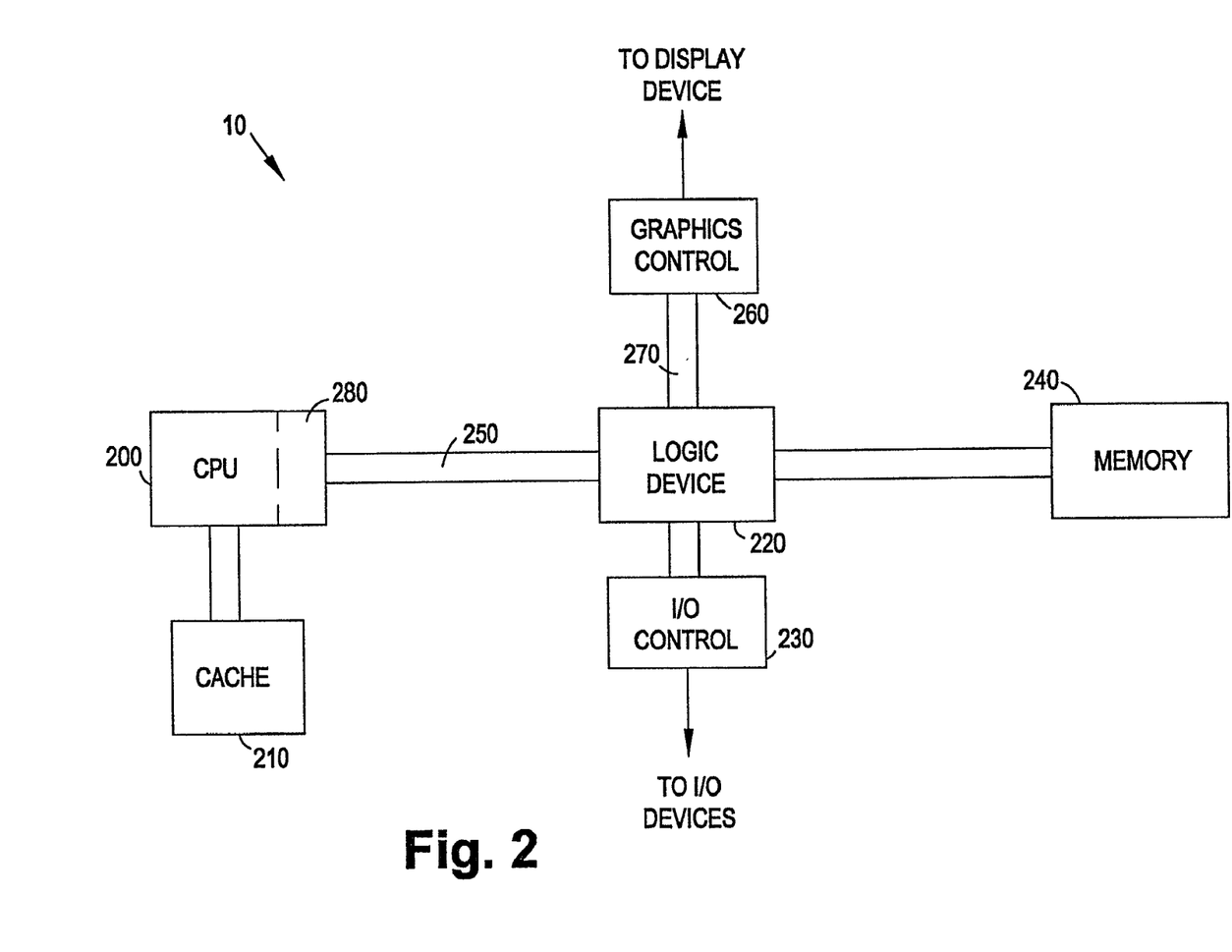
FIG. 2 is a functional block diagram of the logical components in the computer of FIG. 1.

FIG. 2 shows a simplified diagram of the main chipset for computer 10. The computer 10 preferably includes a processor 200, a data cache 210, a logic device 220 which may operate as a memory controller and/or a bus bridge device, an I/O controller 230, a graphics controller 260, and a memory 240. The logic device 220 couples the processor 200 to the memory 240 and to various peripheral devices through a primary expansion bus (Host Bus) 250 such as a Peripheral Component Interconnect (PCI) bus or some other suitable architecture. The I/O controller 230 typically interfaces to basic input/output devices such as the keyboard 30 of FIG. 1. The graphics controller 260 may be coupled to the logic device 220 via an Accelerated Graphics Port bus 270 to drive the display device 40 of FIG. 1. Processor 200 comprises a data cache 210 and processor registers 280. Execution units within the processor 200 are capable of reading data more quickly from the cache 210 than from main memory 240. The processor registers 280 include general purpose registers (e.g., integer and floating point registers) and control and status registers such as program counters and interrupt control registers.

It should be noted that the devices shown in FIG. 2 represent a simplified chipset commonly found in a computer 10 and may include other devices not shown in FIG. 2. For instance, the computer 10 may include a plurality of processors 200, memory arrays 240, and logic devices 220. The computer 10 may also provide access to a plurality of expansion buses and include other expansion devices. In general, any of a wide range of computer systems using a variety of program optimizers may implement the preferred embodiment.

Figure 3:
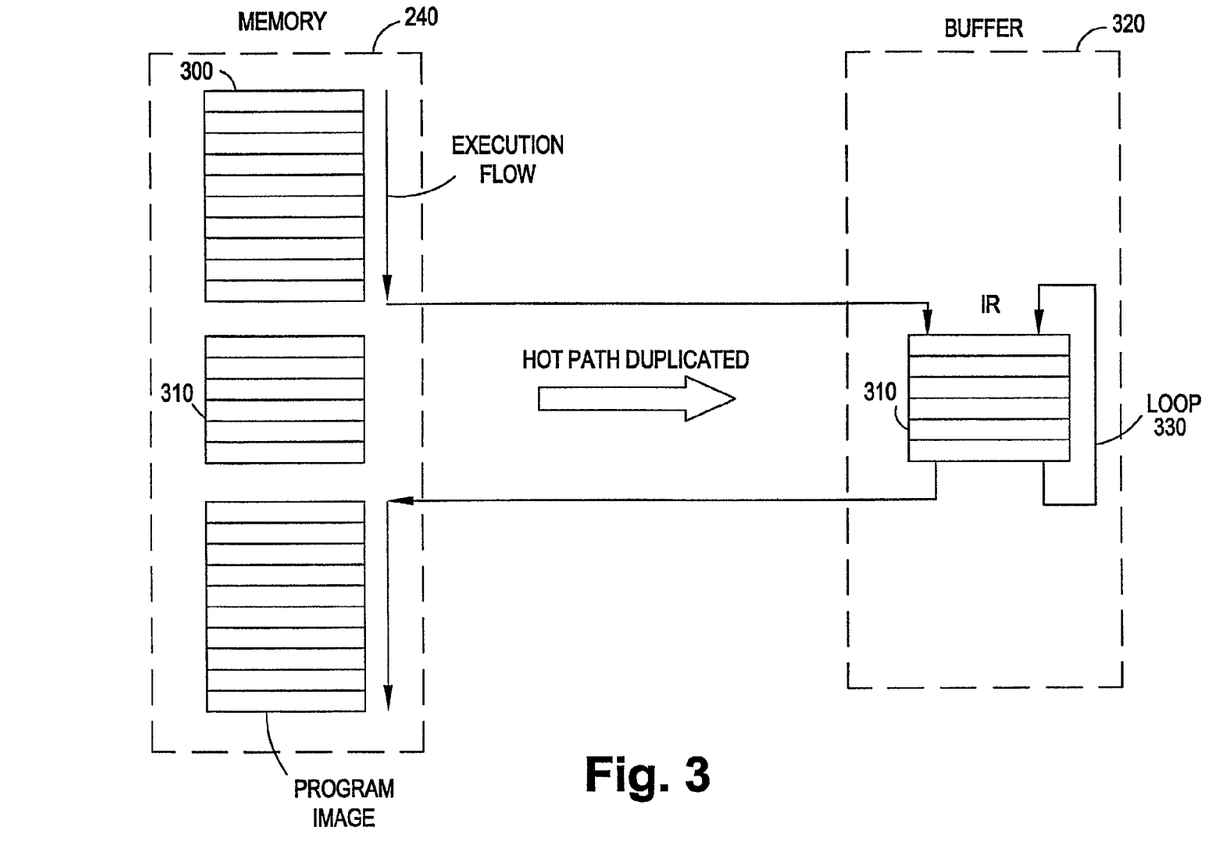
FIG. 3 shows a block diagram showing a program image as it is executed according to the preferred embodiment on the computer of FIG. 1.

Referring now to FIG. 3, the computer 10 is configured to execute any number of conventional programs (i.e., an executable image, EXE). The program image 300 is created and placed in memory 240 where it is accessed and executed by processor 200. Within the program image 300, there are any number of hot paths 310, which are program paths that are executed frequently. A program optimizer is capable of locating such hot paths 310 and the preferred embodiment provides a means of locating pseudo-invariant instructions within any given hot path 310.

In accordance with the preferred embodiment, the executable program is modified and the modified program image 300 is placed in memory 240. In addition, a transformed copy of the hot path 310 is created and copied to a software buffer 320. The transformed copy is preferably referred to as an Intermediate Representation (IR). Instructions in the IR form an alternative representation of the computation along the hot path. The in-memory image 300 is modified so that control is passed to an interpreter that will evaluate the IR just when the original program would have entered the hot path 310. The transformed (IR) copy of the hot path is modified as well to include an instruction to return to the appropriate place in the original image 300 when execution of the hot path 310 is finished. This process is referred to as a program patch.

If the hot path forms a loop, the IR sequence may include loop back instructions. This is represented by the loop back arrow 330 shown in FIG. 3. The IR instructions are executed several times to check for pseudo-invariance and the results of these repeated tests are stored for delivery to the program optimizer. The actual means by which the results are analyzed and stored is discussed below. The details of the process of transferring control from the program image 300 to the IR in the software buffer 320 is shown in FIG. 4.

Figure 4:
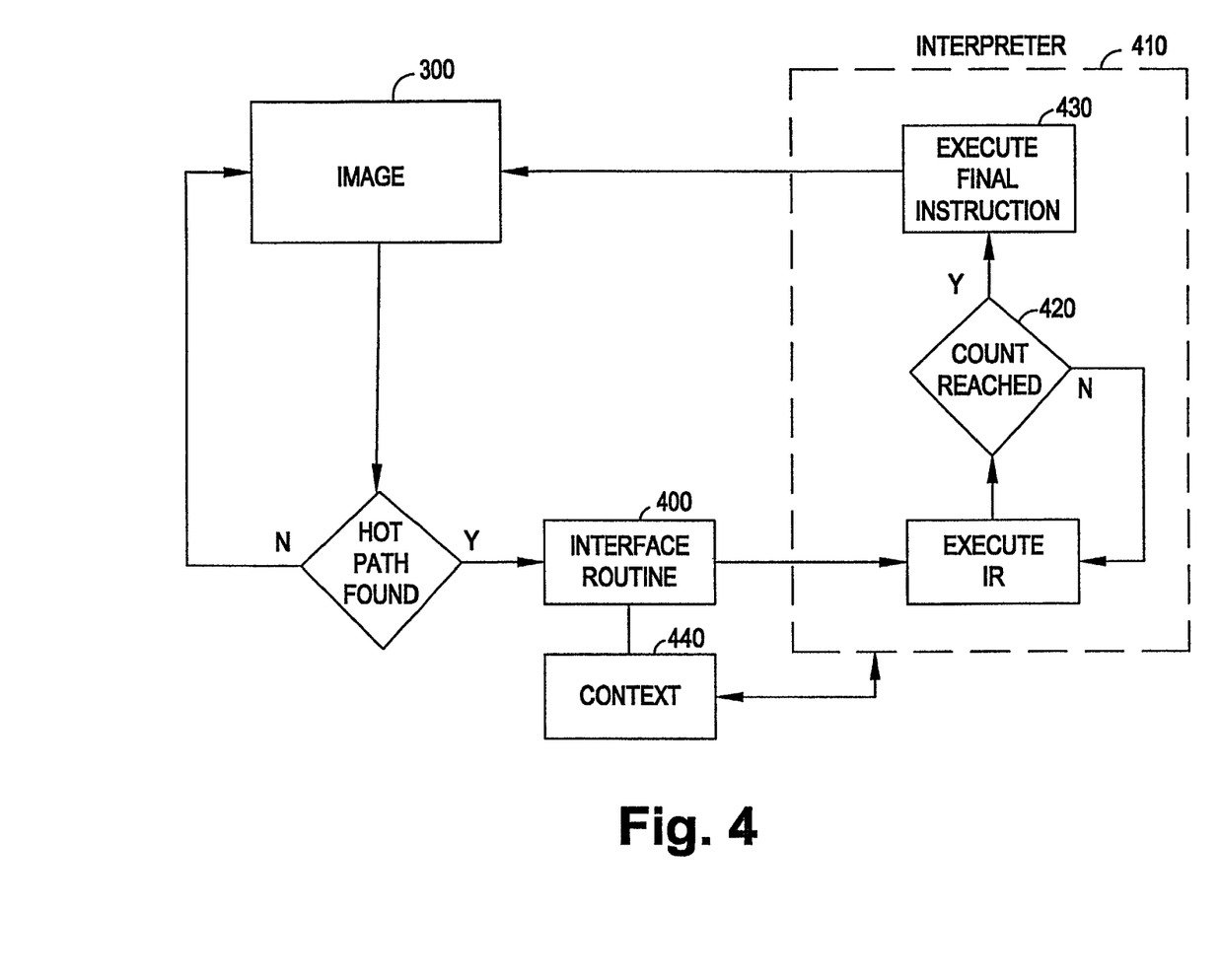
FIG. 4 shows a flow diagram showing the procedure by which the preferred embodiment searches a hot path for pseudo-invariant instructions in a program running on the computer of FIG. 1.

FIG. 4 shows a flow diagram depicting the transfer of control from the program image 300 to the IR and back. The program image 300 is executed normally until the first instruction on a hot path 310 is detected. As discussed above, the program image 300 is modified to switch control to the interpreter when a hot path 310 is detected. The program image 300 is modified to branch to a special interface routine 400. The interface routine 400 builds a context 440 to capture the current state of the computer system 10. The context information is stored in memory 240 and preferably contains copies of the values of all the general purpose and floating point registers 280, the program counter from processor 200 and any associated machine state. This context information 440 is then used by an interpreter 410. The interpreter 410 may exist as a hardware or software version of the computer system and interprets each instruction in the IR. The interpreter 410 computes the outputs of each instruction in the hot path 310 using the IR instruction itself, the context 440 stored by the interface routine 400 and the computer's memory 240. Storage of the results of this interpretation is discussed below.

The preferred embodiment seeks to analyze the individual instructions in the hot path 310 to determine if they are pseudo-invariant. To improve accuracy, the interpreter will execute the instructions in the IR a plurality of times. The number of times the IR is executed affects system performance, overhead, and accuracy of the identification method. In general, better accuracy may be obtained through more iterations at the expense of additional overhead. Thus, system designers have control over the number of times the interpreter 410 is run. In the preferred embodiment, a counter 420 will count down the number of times a designer wishes to run the interpreter before transferring control back to the original program image 300. Once all iterations are run, the counter 420 will instruct the interpreter 410 to transfer control back to the program image 300 and the interpreter 410 will execute a final instruction 430. The final instruction 430 reloads data from the context 440 back into the registers 280 in the processor 200 and transfers control of the program back to the processor 200 to run the program image 300.

Figure 5:
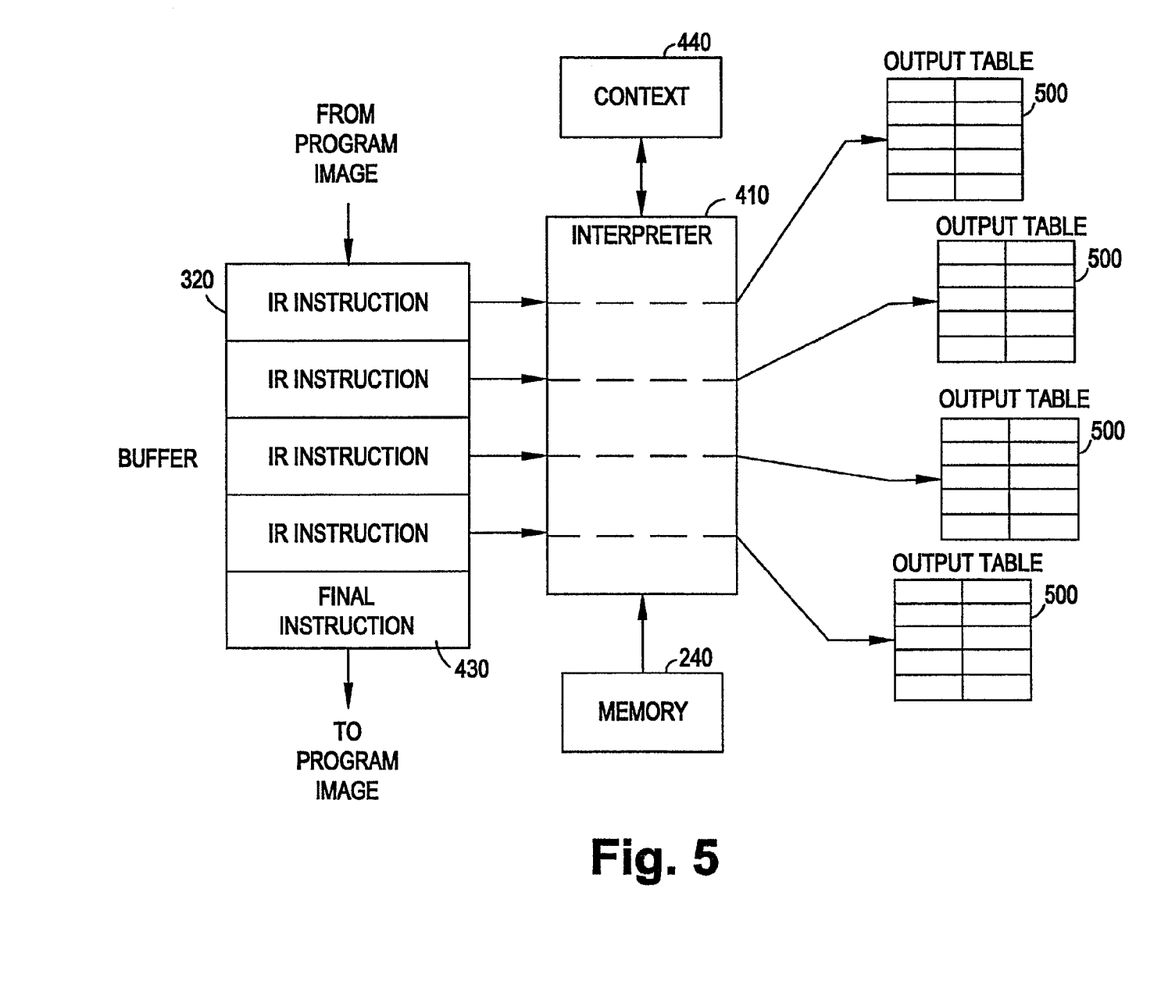
FIG. 5 shows a block diagram describing the function of the interpreter in the preferred embodiment.

Referring now to FIG. 5, the method by which the interpreter 410 stores outputs of the instructions in the IR is shown. Each instruction in the IR is interpretable. As discussed above, the interpreter 410 computes the outputs of each instruction on the hot path given the instruction itself, context 440 stored by the interface routine 400 and the computer's memory 240. In short, the interpreter computes a result for each instruction in the IR just as the computer would. As each instruction is interpreted, the results are stored in a table 500 that is unique to every instruction in the IR. In the preferred embodiment, the table 500 includes entries for the output value of the instruction and a frequency count. The table may also store additional properties such as memory addresses of data loaded and stored from memory 240 during instruction execution. Thus, after the interpreter loops through iterations of the IR, the frequency count corresponding to each output value for each instructions can be compared against the total number of times the IR is executed to determine the percentage of time a particular output is generated. If this percentage is above a designer-established threshold, the instruction may be classified as pseudo-invariant.

Once the interpreter has executed each of the IR instructions the required number of times, the interpreter 410 will execute the final instruction 430 and execution flow will return to the program image 300.

The advantage to this method is that the IR and the data in the various output tables 500 is in a form that is readable by and immediately available to an optimizer. Furthermore, as the IR instructions are computed, the context 440 may be updated by the interpreter so that when the data in the context 440 is written back to the processor registers 280, the computer 10 may continue executing the program image 300 as if the interpreter 410 was never invoked. The preferred embodiment therefore provides an economic method detecting pseudo-invariant instructions in those hot paths as well as providing a streamlined method of providing such information to a program optimizer or specializer.

The above discussion is meant to be illustrative of the principles and various embodiments of the present invention. Numerous variations and modifications will become apparent to those skilled in the art once the above disclosure is fully appreciated. For example, the IR instructions may alternatively be written to a dedicated space in memory or a physical drive and the interpreter may access the instructions accordingly. It is intended that the following claims be interpreted to embrace all such variations and modifications.

What is claimed is:

1. A computer system, comprising:
   a processor;
   a system memory coupled to said processor;
   an interpreter software program loaded into the memory; and
   at least one input/output device coupled to at least one processor;
   wherein the processor is configured to execute binary applications and also execute an application optimizer capable of detecting frequently executed paths within the application; and
   wherein detection of a frequently executed path causes the interpreter software program to execute the instructions in the detected frequently executed path a plurality of times and causes outputs for each instruction to be stored in memory with a frequency count for each unique instruction output; and
   wherein if the frequency count for a given output from a given instruction is above a threshold, the given instruction is identified as pseudo-invariant.

2. The computer system of claim 1 further comprising:
   a software buffer configured to hold a transformed copy of the frequently executed path.

3. The computer system of claim 1 wherein:
   the interpreter software program is configured to emulate the computer system processor and executes instructions equivalent to those in the frequently executed path and computes the output for each instruction and stores the output and frequency count for the output in a table corresponding to each instruction.

4. The computer system of claim 3 wherein:
   when the interpreter executes the instructions in the frequently executed path, the computer processor stops execution of the instructions from the binary application.

5. The computer system of claim 4 further comprising:
   an interface routine configured to read register contents from the computer system processor;
   wherein after the computer system processor stops executing the instructions from the binary application and before the interpreter executes the instructions in the frequently executed path, the interface routine reads and stores the register contents in a memory context for access by the interpreter; and wherein when an instruction in the frequently executed path requires an update to the register contents the contents of the memory context is updated; and wherein when the interpreter is finished executing the instructions in the frequently executed path the contents of the memory context are written back to the corresponding contents in the processor registers.

6. The computer system of claim 2 wherein:

the contents of the tables corresponding to instructions in the frequently executed paths and the software buffer are readily available to the application optimizer;

and wherein if the optimizer determines that the frequency counts in the table for any given instruction are above a threshold, the instruction may be classified as pseudo-invariant and the optimizer may eliminate execution the instruction in the frequently executed path to improve application performance.

7. A method of identifying pseudo-invariant instructions in computer program hot paths, comprising:

executing instructions in the computer program until a hot path is detected;

creating an intermediate representation of the hot path in a software buffer;

copying computer machine state and computer processor register contents to a context in memory;

computing an output a plurality of times for each instruction in the intermediate representation of the hot path; and comparing a unique output frequency count for each instruction in the intermediate representation of the hot path with a pseudo-invariant threshold.

8. The method of claim 7 further comprising:

storing the results of the computation for each instruction and storing the frequency with which each unique output results from the computation in an output table;

wherein the contents of the output table and the contents of the software buffer that holds the intermediate representation are accessible by a program optimizer.

9. The method of claim 8 further comprising:

classifying an instruction as pseudo-invariant if a frequency count in the output table for an instruction in the intermediate representation is above a pseudo-invariance threshold.

10. The method of claim 7 further comprising:

emulating the computer processor with an interpreter;

transferring control of the execution of the program image to the interpreter;

computing the outputs of the intermediate representation using the interpreter; and transferring control of the execution of the program image back to the computer processor when the interpreter has finished computing the outputs of the intermediate representation the required plurality of times.

11. The method of claim 10 further comprising:

invoking an interface routine to copy the computer machine state and computer processor register contents to a context in memory;

updating the contents of the context as needed as the interpreter computes the outputs of the intermediate representation;

writing the contents of the context back to the computer processor registers when the computer processor resumes execution of the program image.

12. The method of claim 11 further comprising:

executing an intermediate representation instruction to write the contents of the context back to the computer processor registers and transfer execution control from the interpreter to the computer processor.

13. The method of claim 7 further comprising:

evaluating the instructions in the intermediate representation a predetermined number of times prior to identifying invariant or pseudo invariant instructions.

14. The method of claim 7 further comprising:

storing additional information such as memory addresses for load or store operations requested by instructions in the intermediate representation in the output table for that instruction.

15. A dynamic pseudo-invariant instruction identification system, comprising:

an intermediate representation copy of a hot path found within an executable computer program image;

an interpreter configured to emulate a computer processor; and a computer system memory;

an interpreter counter;

a table configured to hold output values and a unique output frequency count for each instruction in a hot path;

wherein when a computer processing system executes an application program image and encounters a hot path, control of the execution of the program image is transferred to the interpreter, which executes the instructions in the intermediate representation until the interpreter counter reaches a predetermined number; and wherein for each instruction in the intermediate representation, output values are stored in the table corresponding to that instruction and the unique output frequency count corresponding to each output value is incremented if the value exists in the table or is set to one if the value does not exist in the table; and wherein when the interpreter counter reaches the predetermined number, control of the execution of the program image is transferred back to the computer processing system.

16. The system of claim 15 further comprising:

an interface routine configured to copy and store contents of registers in the computer processor to a context in memory;

wherein when control of the execution of the program image is transferred to the interpreter, the interface routine copies and stores the contents of registers in the computer processor to the context, which the interpreter uses to compute the outputs of the instructions in the hot path.

17. The system of claim 16 wherein:

if the computation of an instruction in the intermediate representation requires a change to the contents of a register in the computer processor, the change is made to the contents of the context.

18. The system of claim 17 further comprising:

a final instruction that is placed in the intermediate representation and is executed after the interpreter counter reaches the predetermined number and before control of the execution of the program image is transferred back to the computer;

wherein the pseudo-instruction copies the contents of the context back to the appropriate registers in the computer processor.

19. The system of claim 15 further comprising:
a pseudo-invariance threshold;
wherein when execution of the program image is transferred back to the computer, the values of the unique output frequency counts in the tables are compared with the pseudo-invariance threshold and wherein if the unique output frequency count for any output in any table is larger than or equal to the pseudo-invariant instruction, the corresponding instruction is classified as pseudo-invariant.

20. The system of claim 15 wherein:
when the interpreter computes the output for each instruction in the hot path, the interpreter may also store other properties unique to that instruction such as memory address locations in the table corresponding to that instruction.

21. A method, comprising:
identifying a hot path of instructions;
executing each instruction of the identified hot path a plurality of times; and
logging a unique output frequency count for each instruction of the identified hot path.

22. The method of claim 21 further comprising transforming the identified hot path of instructions into an intermediate representation.

23. The method of claim 22 wherein executing each instruction of the identified hot path a plurality of times comprises executing the intermediate representation a plurality of times.

24. The method of claim 22 further comprising passing control to an interpreter that executes the intermediate representation a plurality of times when an original program would have entered the hot path of instructions.

25. The method of claim 24 providing the unique output frequency count for each instruction of the identified hot path to an optimizer.

26. The method of claim 21 further comprising customizing amount of times each instruction of the identified hot path is executed.

27. A system, comprising:
a processor;
a memory coupled to the processor, the memory stores a program image executable by the processor; and
a program optimizer configured to locate a frequently executed path of the program image and to receive unique output frequency counts for each instruction of the frequently executed path.

28. The system of claim 27 wherein the processor is configured to stop executing instructions of the program image when the frequently executed path is entered.

29. The system of claim 28 further comprising an interpreter coupled to the memory, wherein the interpreter is configured to operate when the frequently executed path is entered and to execute an intermediate representation of each instruction of the frequently executed path a plurality of times thereby generating the unique output frequency counts.

30. The system of claim 29 wherein the processor is configured to continue execution of the program image when the interpreter finishes executing the intermediate representation of each instruction of the frequently executed path a plurality of times.

* * * * *

UNITED STATES PATENT AND TRADEMARK OFFICE
CERTIFICATE OF CORRECTION

PATENT NO. : 6,968,542 B2  Page 1 of 1
APPLICATION NO. : 09/791912
DATED : November 22, 2005
INVENTOR(S) : Richard J. Bagley et al.

It is certified that error appears in the above-identified patent and that said Letters Patent is hereby corrected as shown below:

In column 5, line 51, insert -- the -- before "context".

In column 7, lines 9-10, in Claim 5, delete "correspondIng" and insert -- corresponding --, therefor.

In column 10, line 5, in Claim 26, insert -- an -- before "amount".

Signed and Sealed this

Twenty-eighth Day of July, 2009

JOHN DOLL
*Acting Director of the United States Patent and Trademark Office*